March 5, 1935. C. LUNDGREN 1,993,176
BEET DIGGING DEVICE
Filed Jan. 2, 1934 3 Sheets-Sheet 1

Inventor
CARL LUNDGREN

March 5, 1935.  C. LUNDGREN  1,993,176
BEET DIGGING DEVICE
Filed Jan. 2, 1934  3 Sheets-Sheet 2

Inventor
CARL LUNDGREN
By
Attorney

March 5, 1935.  C. LUNDGREN  1,993,176
BEET DIGGING DEVICE
Filed Jan. 2, 1934  3 Sheets-Sheet 3

Inventor
CARL LUNDGREN

Patented Mar. 5, 1935

1,993,176

UNITED STATES PATENT OFFICE 1,993,176

BEET DIGGING DEVICE

Carl Lundgren, Greeley, Colo.

Application January 2, 1934, Serial No. 704,896

12 Claims. (Cl. 55—106)

This invention relates to a machine for digging or pulling sugar beets and the like from the ground. The principal object of the invention is to provide a simple and highly efficient machine which will simultaneously pull the beets from a plurality of rows, and which will not become clogged by beet tops, weeds, clods, etc.

Another object of the invention is to provide an efficient machine of this type which can be readily controlled by the operator so as to position the plows at any desired depth for digging or remove them from contact with the ground for turning, which can be levelled upon hillsides or other uneven ground; and in which the guide wheel may be lifted from the ground and the tongue locked so as to allow the team or tractor to quickly turn the device in a limited space.

A further object of the invention is to provide a machine of this character in which the plows or diggers will be pulled from the frame of the machine rather than pushed as in the usual beet puller. Such a construction greatly reduces the weight of the supporting structure and provides a more substantial solid and positive mechanism.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

Figure 1:
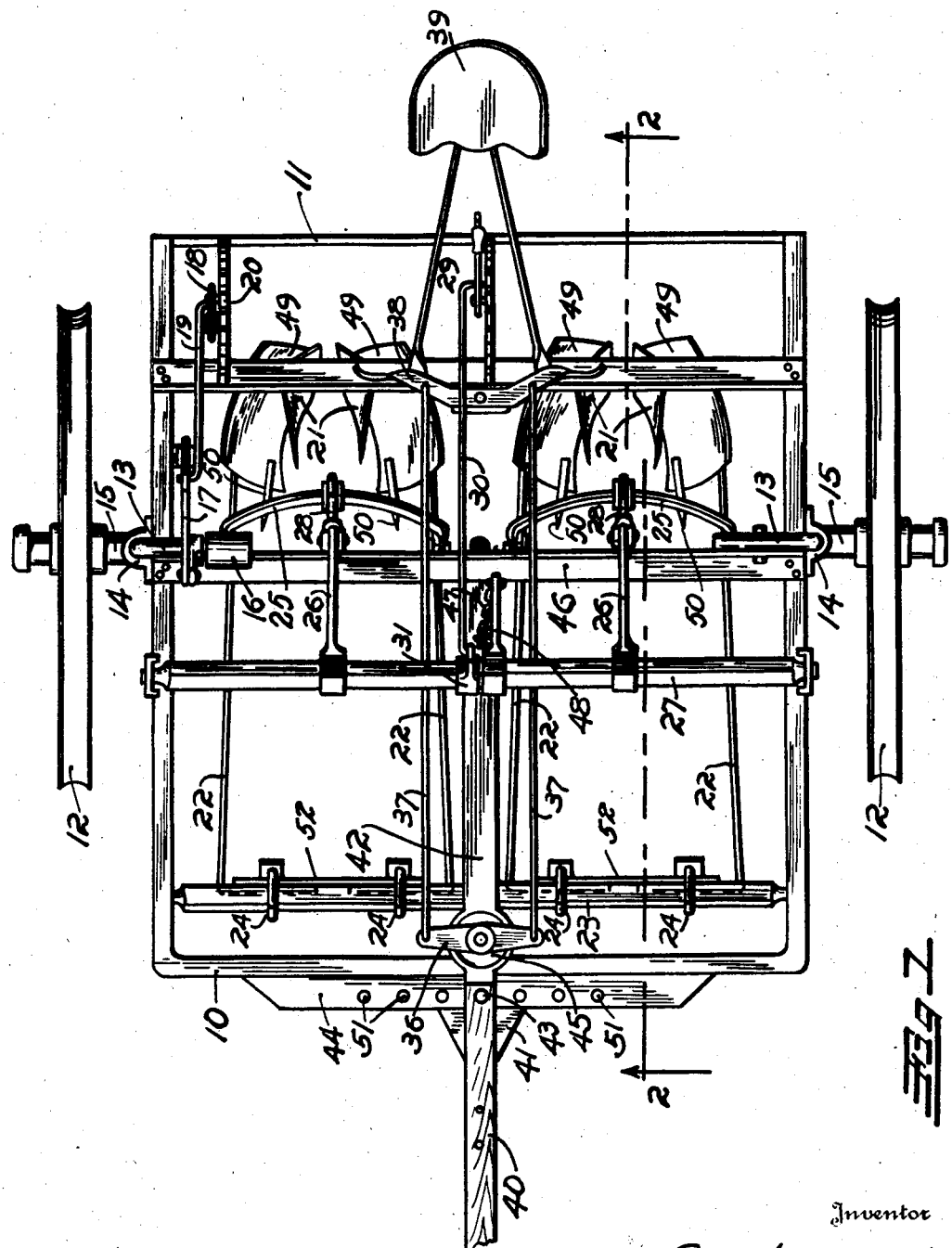
Fig. 1 is a plan view of the invention arranged as a two row digger.
Figure 2:
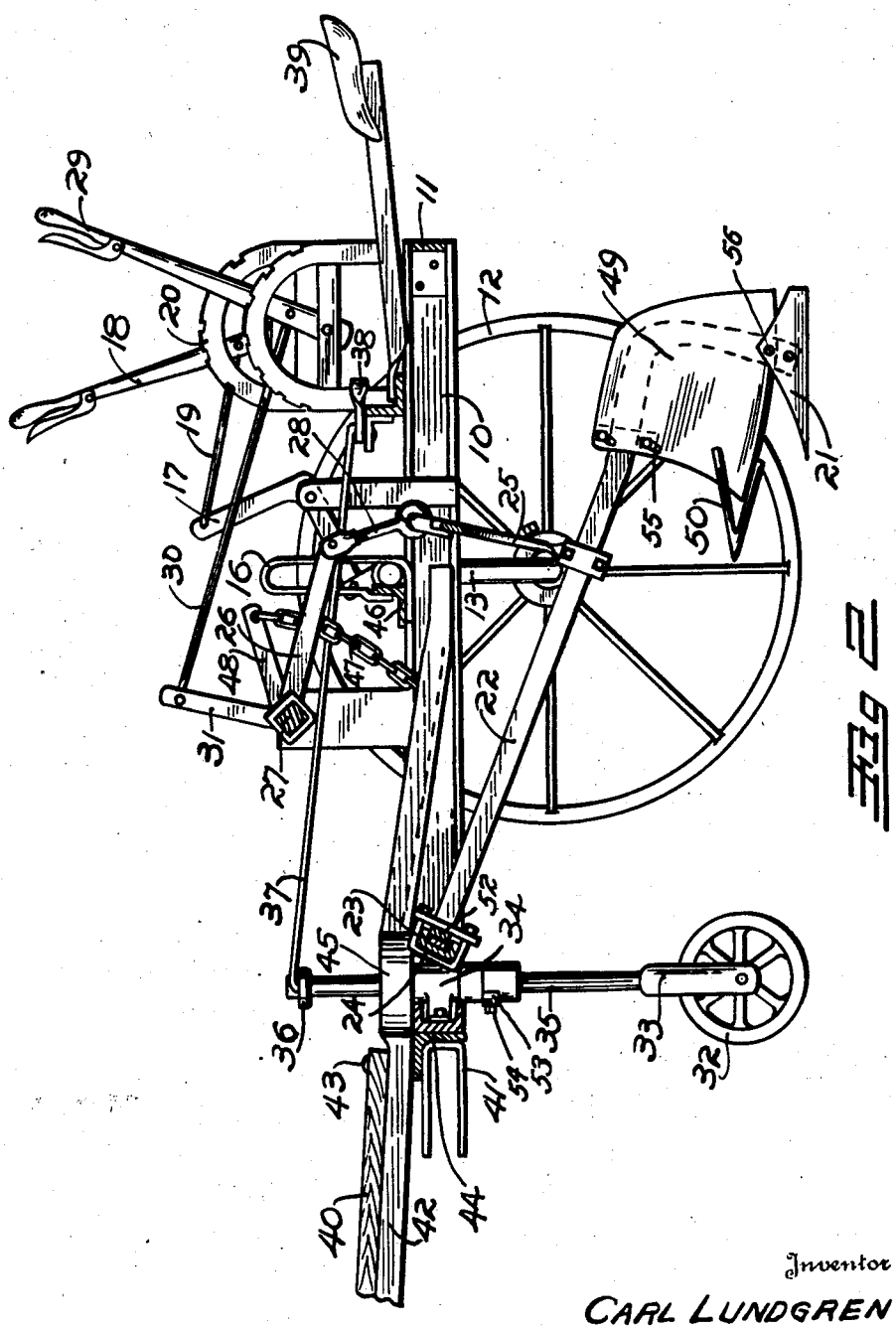
Fig. 2 is a longitudinal vertical section therethrough taken on the line 2—2, Fig. 1.
Figure 3:
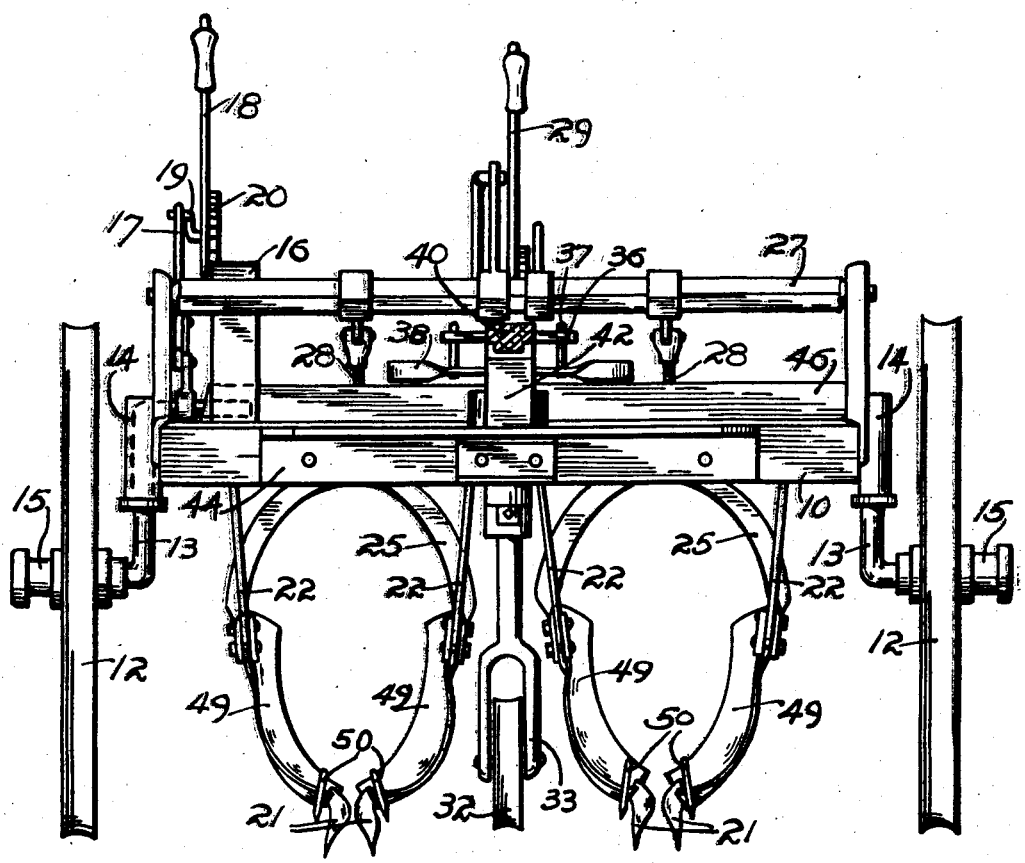
Fig. 3 is a front view thereof.

The machine comprises an open frame 10 which is preferably formed of a U-shaped, channel member closed at its back by means of a cross bar 11. The frame 10 is supported upon ground wheels 12 which are mounted on independent bent axles 13. The axles 13 are formed so as to extend horizontally over the frame 10 at their tops, thence downwardly at the sides through suitable channel brackets 14, which act to maintain them vertical, thence outwardly through long hub sleeves 15. The wheels 12 are adjustably mounted upon the sleeves 15 so that they may be moved inwardly or outwardly and set to suit the spacing of the field rows.

One of the axles 13 is vertically adjustable in its channel bracket 14. This is accomplished by allowing the upper extremity of the axle 13 to ride in a vertical guide member 16. The axle may be raised or lowered in this guide member by means of a bell crank lever 17 operated from a hand lever 18 through a suitable connecting rod 19. The lever 18 may be set in any desired position upon a suitable sector 20. Thus, when the lever 18 is pulled rearwardly, it will allow that side of the frame 10 to move downwardly and, when pushed forwardly it will lift that side of the frame. This enables the operator to level the frame 10 even though one of the wheels is riding at a lower elevation than the other.

The machine as illustrated is adapted for digging two rows simultaneously. The digging is accomplished by means of digging or pulling plows 21 carried on the rearward extremities of downwardly-hooked plow beams 22. There are two of the plows 21 and two of the beams 22 for each of the rows. One plow travels on each side of the beets below the ground and engages their sides so as to loosen and lift them above the ground.

The two plow beams for each row are inwardly turned at their upper extremities and lie in a cross channel 23 which extends entirely across the forward portion of the frame 10 and which is hinged to the side members thereof so that it may rotate. The inwardly turned extremities of the plow beams 22 are clamped into the channel 23 by means of a longitudinal clamp bar 52 and suitable U-bolt clamps 24 which surround the channel 23 and the inwardly turned extremities of the plow beams. The rearward extremities of the plow beams 22 are supported by means of inverted, U-shaped yokes 25, the lower free extremities of which are secured to the plow beams. The yokes 25 are supported from levers 26 mounted upon a cross shaft 27 which preferably has a square cross section. An adjustable link 28 connects each of the levers 26 with its yoke 25. The levers 26 may be moved along the cross shaft to any desired position.

The cross shaft 27 may be rotated by means of a hand lever 29 within reach of the operator. The hand lever 29 is connected by a suitable connecting rod 30 with an actuating lever 31 on the shaft 27. Thus, as the lever 29 is swung forwardly, it will swing the shaft 27 and the levers 26 upwardly so as to lift the plows through the medium of the yokes 25.

The forward extremity of the frame 10 is supported upon a guide wheel 32 carried in a vertical fork member 33 extending through a vertical guide bearing 34. The upper extremity of the fork member 35 is provided with a T-head 36, which is connected through the medium of connecting rods 37 with a pivoted, foot guide member 38. A seat 39 is provided for the operator at a convenient position so that his feet may rest upon the foot guide member 38.

The device is provided with a tongue 40, to which a team may be hitched, and with a draw bar member 41 for attaching it to a tractor. The tongue 40 is secured in a tongue member 42 which is pinned at 43 on an angle member 44 secured along the forward member of the frame 10. The pin 43 should, of course, be secured by a nut, cotter key, or some other device to prevent the pulling from the tongue member 42. The tongue member 42 is provided with an open portion 45 which psses around on each side of the fork shaft 35, thence rearwardly into the frame 10. The open portion 45 allows the tongue a limited lateral movement and the connection at the pivot 43 is sufficiently loose to allow a limited vertical swinging of the tongue. The rear extremity of the tongue member 42 passes beneath a cross member 46 in the frame 10. A chain 47 extends from this rear extremity upwardly to a lifting lever 48 secured on the cross shaft 27. The chain 47 is of a length sufficient to pull the rear extremity of the tongue member 42 upwardly tightly against the bottom of the cross member 46 when the lever 29 is swung forwardly to lift the plows from the ground.

A top guard plate 49 is secured to each plow beam 22 above each of the plows 21. Each of the top plates 49 is provided with a forwardly extending lifting shoe 50.

*Operation*

Let us assume that the device is to be team drawn. The operator aligns his machine with two of the rows and adjusts the U-bolts 24 and the plow beams 22 to space each set of plows exactly in alignment with one of the rows. The levers 26 can be moved along the cross shaft 27 to suit any desired setting. He then lowers his plows by means of the lever 29 to engage the beets at the proper depth and proceeds along the row. The machine is guided by means of the guide wheel 32, which travels between the rows, to off-set any irregularities of the team or rows. Since the beets are usually planted with a four or six row planter there will be a uniform spacing of the rows.

At the end of the rows, the operator pushes the lever 29 forwardly to its limit. This lifts the plows 21 completely from the ground and also lifts the rear extremity of the tongue member 42 against the bottom of the cross member 46. This lifting of the rear extremity of the tongue lifts the guide wheel 32 from the ground and places the entire weight of the front of the machine upon the team. It also locks the tongue so that it can not swing sidewardly so that the team can turn in a very small space with the entire machine pivoting around upon the supporting wheels 12. When aligned with the next two rows the lever 29 will be pulled rearwardly to a proper position for efficient digging.

Should one or the other of the wheels be traveling in a ditch or depression, or upon a hill or raise, the operator can quickly level the machine by swinging the lever 18 and adjusting his plows with the lever 29 so as to accommodate for such ground irregularities. As the plows move along the rows, the shoes 50 will travel at the ground surface and lift the beet tops therefrom, guiding them into the space between the top plates 49 so that they will pass freely through the machine without clogging the plows and without requiring cutting wheels to precede the plows as in the usual beet digging operations.

It will be noted that the angle member 44 is provided with a series of clevice openings 51 so that the tongue can be placed in any desired lateral point to accommodate two, three, or more horses, and also so that the horses may be positioned so that they will walk between the rows.

Figure 4:
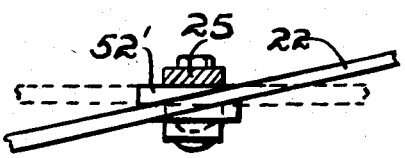
Fig. 4 is a detail view illustrating the connection between the plow supporting yoke and a plow arm.

The plows 21 can be brought closer together or further apart by bringing the forward extremities of the plow beams 22 together or apart in the U-bolts 24. This of course changes the relative position between the plow arms and the extremities of the yokes 25. Any angular space at this point by an angular adjustment can be accommodated by inserting an inclined wedge member 52' between the yoke and the plow beam as shown in Fig. 4.

It is desired to call attention to the fact that, due to their forward attachment to the frame 10, the plow beams pull the plows instead of pushing them. This allows them to be more effectively held in the proper position and also provides a more substantial construction since the plow beams act only in tension and are not subjected to the compressive bending stresses of the usual pushing arms.

It is desired to be understood that although the machine has been described as particularly applicable to the digging of sugar beets, it is of course not limited to this use, but will be applicable to the harvesting of other crops. The machine has also been described as applied to two rows. It is easily conceivable that if the frame 10 were made wider, additional sets of digging plows could be installed to simultaneously dig a greater number of rows.

It will be noted that the fork shaft 35 is supported in the guide bearing 34 upon a suitable set collar 53, provided with a set screw 54. The collar 53 is tied to the guide bearing 34 by means of an inter-engaging lip and groove construction so that when the forward portion of the frame rises, the wheel 32 will be lifted from the ground. The shaft 35 may be secured against vertical movement in the guide bearing in any other desired manner within the skill of the usual mechanic. This enables the front of the frame 10 to be raised or lowered to change and adjust the dip of the plow points 21 so as to accommodate for wear, re-dressing, etc. It will also be noted that the upper and forward portions of the plates 49 are secured to the plow beams 22 through slotted openings 55 and that the lower portions of the plates are secured thereto by means of a pivot bolt 56. The arrangement allows the guides 49 and their shoes 50 to be adjustably raised and lowered to position them at the proper point for lifting the beet tops.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A device for digging beets and the like comprising: a frame; wheels supporting said frame; plow beams hinged adjacent the forward extremity of said frame and extending rearwardly; digging plows carried at the rearward extremities of said plow beams so as to be pulled by the latter as said frame moves along a row of beets; and means for raising or lowering the rearward extremities of said plow beams, in combination with means for simultaneously raising or lowering the forward portion of said frame.

2. A device for digging beets and the like comprising: a frame; wheels supporting said frame; plow beams hinged adjacent the forward extremity of said frame and extending rearwardly; digging plows carried at the rearward extremities of said plow beams so as to be pulled by the latter as said frame moves along a row of beets; and means for raising or lowering the rearward extremities of said plow beams; a hand lever; and means for causing actuation of said hand lever to raise or lower one side of said frame.

3. A beet digging machine comprising: a frame; a rotatable cross member extending laterally across the forward portion of said frame; a pair of plow beams secured to said cross member and extending rearwardly and downwardly therefrom; co-acting digging plows secured on the rearward extremities of said plow beams; and means for raising or lowering the rearward extremities of the said beams so as to rotate said cross member in said frame.

4. A beet digging machine comprising: a frame; a rotatable cross member extending laterally across the forward portion of said frame; a pair of plow beams secured to said cross member and extending rearwardly and downwardly therefrom; co-acting digging plows secured on the rearward extermities of said plow beams; means for raising or lowering the rearward extremities of the said beams so as to rotate said cross member in said frame, said rearward extremities being curved downwardly to said digging plows; and top guard plates secured to said latter extremities above said plows to guide the beet tops between said beams.

5. A beet digging machine comprising: a frame; a rotatable cross member extending laterally across the forward portion of said frame; a pair of plow beams secured to said cross member and extending rearwardly and downwardly therefrom; co-acting digging plows secured on the rearward extremities of said plow beams; means for raising or lowering the rearward extremities of the said beams so as to rotate said cross member in said frame, said rearward extremities being curved downwardly to said digging plows; and top guard plates secured to said latter extremities above said plows to guide the beet tops between said beams; and lifting shoes extending forwardly from said guide plates to lift said tops from the ground and position them between said plates.

6. A beet digging machine comprising: a frame; a rotatable cross member extending laterally across the forward portion of said frame; a pair of plow beams secured to said cross member and extending rearwardly and downwardly therefrom; co-acting digging plows secured on the rearward extremities of said plow beams; means for raising or lowering the rearward extremities of the said beams so as to rotate said cross member in said frame; a tongue member pivoted at the front of said frame so that it may swing both horizontally and vertically; a frame member above the rearward extremity of said tongue member; and means for pulling the rearward extremity of said tongue member upwardly against said frame member so as to lift the front of said frame and secure said tongue member.

7. In a beet digger having beet digging plows: means for preventing the beet tops from interfering with said plows comprising: a plate secured above each plow, said plates curving outwardly and upwardly, and rearwardly and inwardly, so as to gather and lift the beet tops as said beets are dug; and a shoe extending forwardly from each plate to a substantial point, thence rearwardly and upwardly between the plates, said shoes being positioned to travel substantially at the ground level so as to lift said tops from the ground and position them between said plates.

8. A beet digging machine comprising: a wheeled frame; a pair of similar plow beams hinged at their forward extremities to said frame and depending rearwardly therefrom; a yoke extending between and supporting said beams intermediate their extremities; and means for adjusting the spacing of said beams at their forward extremities so that said yoke will act as a fulcrum to swing the rearward extremities of said beams in an opposite direction when said forward extremities are adjusted.

9. A device for digging beets and the like comprising: a frame; wheels supporting said frame; plow beams hinged adjacent the forward extremity of said frame and extending rearwardly; digging plows carried at the rearward extremities of said plow beams so as to be pulled by the latter as said frame moves along a row of beets; a lever for raising or lowering the rearward extremities of said plow beams; a tongue extending forwardly from said frame, said tongue being pivoted intermediate its extremities at the front of said frame so as to extend rearwardly from said front; and means connecting the rearward extremity of said tongue with said lever so that the rearward extremity of said tongue will be lifted as said plows are lifted.

10. A beet digger comprising: an open rectangular frame; a standard extending upwardly from each side of said frame; a rotatable shaft extending laterally of said frame between said standards; a pair of plow beams hingedly mounted below said shaft; a first lever extending from said shaft and supporting said beams; a tongue extending longitudinally inward from the front of said frame and pivotally mounted thereon; a second lever projecting from said shaft; a connecting member between said tongue and said second lever; and means for rotating said shaft so as to cause said levers to simultaneously lift both said beams and said tongue.

11. A beet digger comprising: an open rectangular frame; a standard extending upwardly from each side of said frame; a rotatable shaft extending laterally of said frame between said standards; a pair of plow beams hingedly mounted below said shaft; a first lever extending from said shaft and supporting said beams; a tongue extending longitudinally inward from the front of said frame and pivotally mounted thereon; a second lever projecting from said shaft; a connecting member between said tongue and said second lever; means for rotating said shaft so as to cause said levers to simultaneously lift both said beams and said tongue; and a surface on said frame against which said tongue contacts when lifted so as to prevent pivoted movement of said tongue when desired.

12. In a beet digging device having a wheeled frame; a rotatable cross bar extending laterally across said frame; plow beams secured to said cross bar and extending first rearwardly from said cross bar, thence downwardly; digging plows secured at the lower extremities of said downwardly extending portions; and means for raising or lowering the free extremities of said plow beams.

CARL LUNDGREN.